3,115,476
PROCESS FOR MAKING POLYESTER RESIN AQUEOUS SUSPENSION AND RESULTING COMPOSITION
Maynard C. Agens and Kenneth M. Kiser, Schenectady, N.Y., assignors to General Electric Company, a corporation of New York
No Drawing. Filed Jan. 23, 1961, Ser. No. 83,907
11 Claims. (Cl. 260—29.2)

This invention is concerned with suspensions of polyester resins. More particularly the invention relates to a polyester resin aqueous suspension obtained by (1) dissolving in a heated oxygen-containing solvent selected from the class consisting of acetone, methyl ethyl ketone, tetrahydrofurfuryl alcohol, diethyl ketone, and mixtures of these solvents, a polyester resin comprising the product of reaction of (a) a lower dialkyl ester of a member selected from the class consisting of terephthalic acid, isophthalic acid, and mixtures of said acids, (b) ethylene glycol, and (c) a saturated aliphatic polyhydric alcohol having at least three hydroxyl groups, (2) cooling the solution to below 60° C., (3) heating the mixture and solvent to a point of solution of the solid resin in the solvent, (4) cooling the mixture to give a congealed product, and (5) dispersing the congealed product in water.

The polyester resins which are employed in the practice of the instant invention are described and claimed in U.S. Patent 2,936,296 issued May 10, 1960, in the names of Frank M. Precopio and Daniel W. Fox and assigned to the same assignee as the present invention. These polyester resins have been found to be especially suitable for use as electrical insulating coatings and are found to possess outstanding resistance to thermal stresses and also thermal stability, making them especially useful in insulated conductors and in dynamoelectric machines where thermal stability is a necessary requirement for improved power output. With improved thermal stability of insulating coatings, it is possible to increase the current density of these conductors and thereby increase the power output of a dynamoelectric machine.

The above polyester resins comprising the product of reaction of a mixture of ingredients comprising (a) a lower dialkyl ester of a member selected from the class consisting of terephthalic acid and isophthalic acid and mixtures of said members, (b) ethylene glycol, and (c) a saturated aliphatic polyhydric alcohol having at least three hydroxyl groups, said reaction product hereinafter being referred to as "polyester resin," have heretofore been employed in the form of organic solutions for coating and insulating purposes. In the past, cresylic or phenolic type solvents such as cresylic acid have been used in the preparation of these coating compositions for conductors. Although the solvent does not contribute to the thermal properties of the coating, in some instances it may have an undesirable effect on the cured coating because of the tendency of such cresylic and phenolic bodies to form color which remains in the cured film and also because of the high cost of the solvent used.

Although the need in the industry for an insulating coating made from these polyester resins that could be produced from an aqueous dispersion of such resins has been well recognized, nevertheless heretofore, such aqueous dispersions have not been successfully attained because of difficulties which have been encountered in connection with the development of stable systems involving aqueous mixtures. Furthermore, in the past it has been found that the use of solvents has resulted in coating resin solutions from these polyester resins of high viscosity at high solid content whereas the desirable objective is that the coating medium have a low viscosity at high solids content to make it possible to increase the thickness of the coating with each pass of the conductor through the coating composition, thereby to reduce the number of passes required through the system in order to obtain a coating of predetermined thickness.

In the usual commercial coating operations employing solutions of these polyester resins, it is necessary to recycle the wire or conductor being coated a number of times through the resin solution and wire coating tower in order to obtain the desired build of the coating. The rate at which the film builds up on the wire depends upon the amount of the coating medium that is attracted and held on the surface of the wire as it travels upward from the surface of the coating medium and is a function of the wetting properties of the wire and coating medium, wire size, wire speed, solids content, and viscosity of the coating medium. Thus, for a given wire size, wire speed and coating medium, the solids content and viscosity of the coating medium will influence the rate at which the film builds up. Therefore, it is desirable that the coating medium have a low viscosity at a high solids content to make it possible to increase the thickness of the coating per pass and reduce the number of passes through the system in order to obtain a coating of predetermined thickness. In the past it has not been feasible to prepare low viscosity solutions with high solids contents since the viscosity of the solution is appreciably increased as the concentration of the solids in the solution is increased. It will be seen that a higher solids content in the coating medium makes it possible for heavier coatings to be applied in a single pass through the coating medium and the wire tower thereby reducing the total number of passes required to complete a coating process. It is, therefore, desirable that a coating medium be developed having a high solids content at relatively low viscosities.

Attempts have been made in the past to make dispersions of the aforesaid polyester resins. The usual technique for making such dispersions has been to grind or mill the dry solid polyester resin with water in the presence of suitable dispersing or wetting agents. However, such attempts to make dispersions have not been too successful for the main reason that grinding normally does not reduce the solid polyester resin to a sufficiently fine state so as to enable smooth coherent coatings to be formed when such dispersions are used to coat conductors. Furthermore, the grinding technique requires careful controls and therefore the chance for obtaining satisfactory dispersions are greatly reduced. Finally, the stability of such dispersions in water is of limited duration and the dispersion must be stirred periodically when coating conductors are passed through the aforesaid aqueous dispersions.

It is, therefore, a primary object of the invention to provide an improved coating composition suitable for insulating electrical conductors.

It is a further object of the invention to provide an improved insulating coating produced from an aqueous dispersion of polyester resins.

It is still a further object of the invention to provide an aqueous dispersion of polyester resins which is readily coatable on metallic conductors and which is capable of existing at a low viscosity even when in a high solids concentration.

The foregoing and other objects of this invention may be achieved by coating an electrical conductor with a dispersion in which the polyester resin present with the certain class of solvents and water comprises from 15 to 45 percent by weight of said dispersion, said polyester solids comprising very fine particles, preferably at least 20 to 100 percent of which are less than 0.5 micron in size wherein the particles comprise the product reaction of a mixture of ingredients composed essentially of (a)

from about 25 to 56 equivalent percent, preferably from 36 to 50 equivalent percent of a member selected from the class consisting of terephthalic acid, isophthalic acid, lower dialkyl esters of said acids and mixtures thereof, (b) from about 15 to 45 equivalent percent, and preferably from 25 to 40 equivalent percent, ethylene glycol, and (c) from 13 to 44 equivalent percent, and preferably from 20 to 32 equivalent percent, of a saturated aliphatic polyhydric alcohol having at least three hydroxyl groups, the sum of said equivalent percents being equal to 100 equivalent percent.

We have also unexpectedly discovered that by employing the above-described technique of at least twice dissolving the polyester resin in the specified class of solvents and thereafter allowing the polyester resin to cool and congeal in the solvent, that thereafter when we add the water and effect intimate mixing of the congealed product with the water, the dispersion thus obtained comprises finely divided particles of uniform colloidal size (less than 0.5 micron in diameter) and that these finely divided particles suspended in the water have good stability; in some instances there is little, if any, settling of the dispersion even after standing several days at room temperature (about 23° C.). When attempts are made to form aqueous dispersions by mixing or grinding the polyester resin with water, even in the presence of suitable wetting or dispersing agents, the particles are irregular, and undesirably large, and the stability of the dispersion or suspension formed is poor. As an additional advantage, by means of our process, dispersions can be obtained in a relatively short period of time as contrasted to the excessive times required in the usual grinding or milling of the polyester resin with water required to obtain acceptable particle size of the polyester resin dispersed in the aqueous phase.

The polyester resins which may be used in the practice of the present invention may be considered as condensation products of a lower dialkyl ester of a member selected from a class consisting of terephthalic acid, isophthalic acid and mixtures of such acids, ethylene glycol, and a saturated aliphatic polyhydric alcohol having at least three hydroxyl groups. Such compositions and methods for preparing the same are more fully described in the aforementioned Precopio and Fox patent. Representative isophthalic and terephthalic acid esters which may be used are, for instance, those dialkyl esters containing alkyl radicals having from 1 to 8, and preferably from 1 to 4 carbon atoms, include dimethyl terephthalate, diethyl terephthalate, dipropyl terephthalate, dimethyl isophthalate, dipropyl isophthalate, dibutyl terephthalate, etc. The polyhydric alcohols are those saturated aliphatic polyhydric alcohols having at least three hydroxyl groups and include both polyhydric alcohols in which the hydroxyl groups are connected by a plurality of carbon-carbon linkages, as well as other alcohols having at least three hydroxyl groups. Examples of such polyhydric alcohols are glycerine, sorbitol, mannitol, diglycerol, dipentaerythritol, pentaerythritol, etc.

The term "functional group" as used in the present application is intended to refer to a carboxyl group (—COOH)

an ester group (—COOR, where R is an alkyl radical), or a hydroxyl group (—OH). The term "equivalent" as used in the present application refers to the number of mols of a substance multiplied by the number of functional groups present in its structure. Thus, the number of equivalents of dimethyl terephthalate in a quantity of dimethyl terephthalate is the number of mols of dimethyl terephthalate present times two. The number of equivalents of glycerin present in a given quantity of glycerin is the number of mols of glycerin present in that quantity times three. The term "equivalent percent" refers to the number of equivalents of a particular reactant divided by the total number of equivalents of all reactants times one hundred. The compositions employed in the present invention are described in terms of equivalents instead of in terms of mols, since the ingredients which make up the polyester resins react equivalent for equivalent rather than mol for mol.

To form such polyester resins, a lower dialkyl ester of terephthalic acid or of isophthalic acid, or of both, ethylene glycol and the polyhydric alcohol are added to a suitable reaction vessel. Since the reaction here involved is an alcoholysis reaction which is known to be slow, it is preferred that one use of an alcoholysis catalyst, such as, for instance, lead oxide, lead acetate, zinc oxide, cadmium acetate, zinc acetate, nickel acetate, etc. The amount of alcoholysis catalyst employed is not critical and may vary. Generally, one can employ about 0.01 to about 5 percent, by weight, of the alcoholysis catalyst, based on the total weight of the dibasic acid compounds. After forming the mixture of ingredients, it is desirable to heat the reaction to obtain a molecular weight material as high as possible without causing gelation of the resulting product. This can be accomplished by heating the reaction at a temperature of from room temperature to a temperature of about 200° to 270° C. over a period of from two to six hours. During the initial heating period it is sometimes found that when lower dialkyl esters of the acids are employed, sublimation of the latter ester often occurs. To prevent or at least minimize this sublimation, xylene or some similar material may be added to the reaction mixture to keep the lower dialkyl ester of the acid in solution. The xylene or other similar material takes no part in the reaction and is distilled from the reaction mixture during the course of the reaction. Any water which may be present is also distilled from the reaction mixture during the heating process. The solid reaction product thus obtained is added directly to the oxygen-containing compound specifically referred to above, maintained at a temperature conducive to complete solution of the polyester resin in the solvent. Although the amount of solvent which may be employed can be varied widely, generally these solvents should be employed in such amounts that the polyester resin solids content of the entire solution thus formed ranges from about 10 to about 50 weight percent.

After having dissolved the polyester resin in the suitable solvent, the solution is allowed to cool, preferably to below or around room temperature, e.g., within the range from about 0 to 40° C. Thereafter, the mixture (which generally is in a flocculent precipitated state if the cooling is rapid, but is less flocculent if cooled slowly, e.g., by allowing the polyester resin solution to cool by itself to room temperature) is heated to a temperature at which solvation again takes place (e.g., from about 65 to 100° C.). After this second heating, if the mixture is then cooled, it will be found that the solution begins to congeal and solidifies to form a grease-like structure which is capable of being stirred, and contains the polyester resin intimately dispersed in the form of colloidal-size particles. Care should be exercised that in the second heating of solvation, the temperature should not be too high, or else on cooling, a flocculent precipitate will be obtained instead of the homogeneous dispersion. If only one heating and cooling step is employed, the polyester resin is not in suitable form for dispersion in water to make aqueous dispersions and furthermore the stability as a dispersion is greatly reduced, which is highly undesirable when making coating compositions.

In order to make the aqueous suspension of the polyester resin, it is only necessary to transfer the congealed product to a suitable mixing apparatus, for instance, a Waring Blendor and combine with the congealed product a sufficient amount of water to make the desired solids concentration of the aqueous suspension or dispersion. Generally, it is desirable to employ enough water so that the polyester resin solids are within the range of from 10 to 25 percent, by weight, of the total weight of the water and the solvent. Having made the suspension in water, the latter can be cut back with additional water to reduce the viscosity and the solids concentration still further depending on the intended application for the polyester resin aqueous suspension. These suspensions can then be used to coat conductors in the usual manner employed when using solutions of resins for this purpose. After application of this dispersion to the conductor, the resin can be cured by heating the coated conductor at a temperature varying from about 200° to 500° C. for varying lengths of time. Additional directions for the treating of electrical conductors are found in the aforementioned Precopio and Fox patent.

In order that those skilled in the art can better understand how the present invention may be practiced, the following examples are given by way of illustration and not by way of limitation. All parts are by weight:

EXAMPLE 1

A polyester resin was prepared from the following ingredients:

| | Equivalent percent |
|---|---|
| Dimethyl terephthalate | 46 |
| Ethylene glycol | 31 |
| Glycerin (95 percent, balance 5 percent water) | 23 |

These incredients plus xylene were added to a three liter, three-necked flask fitted with a thermometer, stirrer, and a five inch Vigreux column. A Dean and Stark trap and an additional funnel were attached to the top of the column and a nitrogen blanket was maintained on the system. The system was heated for 30 minutes during which time the temperature rose to about 130° C. and the water and xylene azeotropically distilled from the system. At this time about 0.03 weight percent lead acetate, based on the weight of dimethyl terephthalate, was added and the heating was continued for three and one-half more hours to a final temperature of about 240° C. About 150 parts of the polyester resin thus obtained was then dissolved by adding it to 150 parts tetrahydrofurfuryl alcohol maintained at a temperature of about 125° C. The polyester resin dissolved in the tetrahydrofurfuryl alcohol to make a 50 weight percent solids concentration. Thereafter, the solution of the polyester resin was cooled with an ice bath (about 5 to 10° C.) to give a flocculent precipitate. The mixture was then heated to about 90° C. and when cooled again to room temperature yielded a stiff, grease-like structure. Sufficient water (an equal weight percent) was added to the congealed grease-like product so that the weight concentration of the polyester resin was equal to approximately 25 weight percent of the total weight of the ingredients in the suspensions, specifically the polyester resin, the tetrahydrofurfuryl alcohol and water. Vigorous mixing gave a smooth aqueous dispersion of the polyester resin. Thereafter, additional water was added to the aqueous suspension to reduce the solids concentration of the polyester resin to about 12 to 15 weight percent of the total suspension. This material was used to coat a copper conductor and despite the low viscosity of the dispersion, it was still possible to pass the conductor once through this dispersion and obtain a satisfactory film build. The conductor was heated to a temperature of about 200 to 300° C. to effect curing of the polyester resin and to obtain a smooth, clear, coherent coating. The number of passes which would be required for obtaining the desired build on the conductor were lower with the dispersion of the polyester resin than when one used a solution (without any water) of the polyester resin. Moreover, rectangular wire, which is notoriously difficult to coat properly with the usual resin solutions, can be coated by means of this aqueous dispersion to give insulated structures in which the insulation adequately covers the corners of the rectangular conductor.

EXAMPLE 2

In this example the polyester resin obtained in accordance with the procedure recited in Example 1 was dissolved in other solvents at elevated temperatures in the same manner as was done in Example 1 to a solids concentration of about 40 weight percent. Each of the solutions as formed the second time was allowed to cool by itself to the finally congealed state and then dispersed in water in the same manner as recited in Example 1 to give a 20 weight percent dispersion of the polyester resin, based on the total weight of the resin, solvent and water. Conductors were coated with each of these suspensions, and the coated conductors heated at about 200 to 300° C. to give smooth insulated conductors. The following Table I shows the various solvents which were employed in making the solutions of the polyester resin, and the temperature at which solution of the polyester resin in the solvent was carried out in the dual heating steps. It should be noted that in the case of acetone and diethyl ketone, in order to incorporate 40 weight percent of the polyester resin in these solvents, it was necessary to heat the liquids under pressure at the specified temperatures.

*Table I*

| Solvent: | Temperature, ° C. |
|---|---|
| Acetone | 125 |
| Methyl ethyl ketone | 80 |
| Diethyl ketone | 125 |

EXAMPLE 3

This example illustrates the preparation of polyester dispersions in accordance with our invention using not only the individual solvents in making the suspensions but also using mixtures of the solvents. In each instance, 68 parts of the finely divided polyester resin described in Example 1 was added to a flask and to this flask was added 100 parts of the specific solvent or mixture of solvents. In some instances, small amounts of water were incorporated with the solvent, for cost reduction purposes without adversely affecting the desired result. Each of the mixtures was heated to a temperature sufficient to dissolve the polyester resin; where this temperature was not sufficient to dissolve completely the resin, the mixture was heated for an additional 2 to 3 minutes after the boiling point of the reaction mixture was reached. Each of the mixtures was allowed to cool to room temperature by standing for about 15 to 18 hours. The mixture thus obtained was heated again to an elevated temperature of about 90° C. or the respective boiling point of the reaction mixture, whichever was reached first, and this temperature was maintained for about 5 to 10 minutes. Again, the reaction mixture was allowed to cool to give in each instance a semi-solid dispersion of the polyester resin in the respective solvent or solvents. The following Table II shows the proportions of the various oxygen-containing solvents employed, together with the amount of water used if water was employed. Also recited are the temperature of the first heating together with the temperature at which the second heating was carried out.

*Table II*

| Sample No. | Parts Tetrahydrofurfuryl Alcohol | Parts Methyl Ethyl Ketone | Parts Acetone | Parts Water | First Heating Temp., ° C. | Second Heating Temp., ° C. |
|---|---|---|---|---|---|---|
| A | 100 | | | | 90–120 | 90 |
| B | 50 | 50 | | | 97 | 90 |
| C | 30 | 40 | 30 | | 73 | 78 |
| D | 25 | 75 | | | 85 | 87 |
| E | 10 | 60 | 30 | | 69 | 72 |
| F | 10 | 40 | 50 | | 65 | 66 |
| G | 10 | 15 | 75 | | 60 | 60 |
| H | 5 | 85 | 10 | | 75 | 76 |
| I | | 100 | | | 78 | 78 |
| J | | 75 | 25 | | 71 | 68 |
| K | | 50 | 50 | | 66 | 63 |
| L | | 25 | 75 | | 61 | 58 |
| M | 7 | 10 | 83 | | 60 | 57 |
| N | 35 | 50 | | 15 | 78 | 90 |
| O | 20 | 70 | | 10 | 75 | 80 |
| P | 10 | 70 | | 20 | 75 | 77 |
| Q | 5 | 90 | | 5 | 85 | 77 |

Aqueous suspensions of these semi-solid dispersions were prepared by adding each of the above semi-solid dispersions to an amount of from 100 to 150 parts of water employing a Waring Blendor (or similar device) to effect intimate mixing of the water and the semi-solid solvent dispersion. In preparing these aqueous suspensions, intermittent cooling was employed in order to prevent the temperature from rising much above 40° C. As a result of this, thick "mayonnaise-like" suspensions were obtained and these suspensions showed little or no tendency to settle even after remaining for 5 to 7 days at room temperature. Even when these suspensions were diluted with an additional amount of water (using the aforesaid Waring Blendor) to a 20 weight percent solids of the polyester resin (of the combined liquid phase), there was still little or no tendency for the suspension to settle after standing for 40 hours at room temperature, despite the absence of additives usually employed to stabilize suspensions of solids in liquids.

EXAMPLE 4

In this example, 200 parts of the above-described polyester resin prepared in Example 1 was mixed with 300 parts acetone, placed in an autoclave equipped with a mechanical agitator, and the temperature raised slowly to 140° C. Shortly after the temperature reached 140° C., the autoclave was quenched to 50° C. This was repeated and the contents removed. A clear yellow solution was obtained which solidified slowly upon standing for 2 hours at room temperature. When this semi-solid was dispersed in water (by mixing in a Waring Blendor) about a 20 weight percent solids, it formed a suspension which could be maintained in the suspended state with little difficulty. A #10 copper wire was dipped into a dilute suspension (1 percent solids) of the polyester resin in water-acetone, and the coated wire heated gently in an open flame to effect smoothing out of the particles of polyester resin and to effect curing of the latter. When this wire was tested, with an ohm-meter, it was found to be fully insulated.

It will of course be apparent to those skilled in the art that instead of using the particular polyester resin described above, other polyester resins may be prepared many examples of which have been given in the aforementioned Precopio et al. Patent 2,936,296 employing a variety of proportions designed to give the optimum properties in the polyester resin. In addition, it will also be apparent that other methods for making the polyester resin may be employed and also the concentration of the polyester resin in the solvents recited above may be varied widely prior to making the aqueous dispersions. Moreover, the concentration of the aqueous dispersions can be readily modified with additional amounts of water to give varying viscosities depending on the application involved, the solids content desired, etc.

In addition to using these polyester resin aqueous dispersions as recited above, one can accelerate the cure of these polyester resins by incorporating therein various curing agents or curing catalysts which accelerate the curing reaction of the resin during the coating operation. Among such curing catalysts may be mentioned, for instance, zinc octoate and cadmium octoate. Where metal-containing curing catalysts are employed, satisfactory results can be obtained by using from about 0.2 to 1 percent, by weight, of the metal element of the catalyst (in the form of the metallic salt) based on a total resin solids present in the aqueous dispersion.

The aqueous dispersions herein described may be employed in conventional wire coating operation in the same manner as comparable solutions of the resin are employed. The present invention is particularly adapted to a wire coating operation in which the polyester resin dispersion is applied to the conductor by passing the conductor through the dispersion and then through an oven in the form of a vertical wire tower for the purpose of expelling volatile constituents occurring in the polyester resin dispersion system. Generally, several passes are employed in order to obtain the final film build. After the last pass through the wire tower, the wire is cooled and wound on a reel. Due to the improved concentricity of the coating obtainable with the aqueous dispersion of the resin, the use of dies to extrude the coating liquid over the wire is ordinarily eliminated. A desirable property of the cured coating derived from the aqueous dispersions of the resins herein described is the consistent uniformity of thickness of the coatings which is generally irrespective of the shape of the wire. As the size of the wire decreases, the coating procedure can be readily adjusted to obtain the required film build by lowering the solids content of the dispersion, reducing its viscosity, reducing the wire speed or employing higher wire tower temperatures. Since a production operation requires maximum coating speed, the solids content may also be readily varied.

By means of our process, it is possible to make aqueous dispersions of these polyester resins readily without the use of any wetting agent which heretofore is one of the problems which have been encountered in making aqueous dispersions. The presence of these agents in aqueous dispersions will often deleteriously affect the electrical properties of the insulation on a conductor insulated with these polyester resins. The fact that one is able to make aqueous dispersions with these readily available solvents can also materially reduce the cost of the usual solvents employed in making solutions of these resins.

What we claim as new and desire to secure by Letters Patent of the United States is:

1. The process for making a polyester resin aqueous suspension which comprises (1) dissolving in a heated oxygen-containing solvent selected from the class consisting of acetone, methyl ethyl ketone tetrahydrofurfuryl, alcohol, diethyl ketone, and mixtures of such solvents, a polyester resin comprising the product of reaction of (a) a lower dialkyl ester of a member selected from the class consisting of terephthalic acid, isophthalic acid and mixtures of said members, (b) ethylene glycol, and (c) a saturated aliphatic polyhydric alcohol having at least three hydroxyl groups, (2) cooling the solution to below 60° C., (3) heating the cooled mixture of (2) to solvation temperature, (4) cooling the solution to a point where a congealed product is obtained, and (5) dispersing the congealed product in water.

2. The process for making an aqueous suspension of a polyester resin which comprises (1) dissolving the polyester resin in tetrahydrofurfuryl alcohol maintained at a temperature sufficient to effect solution of the polyester resin in the alcohol, the said polyester resin comprising the product of reaction of (a) dimethyl terephthalate, (b) ethylene glycol, and (c) glycerine, (2) cooling the solution to below 60° C., (3) heating the cooled mixture of (2) to solvation temperature, (4) cooling the solution to a point where a congealed product is obtained, and (5) dispersing the congealed product in water.

3. The process for making an aqueous suspension of a polyester resin which comprises (1) dissolving the polyester resin in acetone maintained at a temperature sufficient to effect solution of the polyester resin in the acetone, the said polyester resin comprising the product of reaction of (a) dimethyl terephthalate, (b) ethylene glycol, and (c) glycerine, (2) cooling the solution to below 60° C., (3) heating the cooled mixture of (2) to solvation temperature, (4) cooling the solution to a point where a congealed product is obtained, and (5) dispersing the congealed product in water.

4. The process for making an aqueous suspension of a polyester resin which comprises (1) dissolving the polyester resin in methyl ethyl ketone maintained at a temperature sufficient to effect solution of the polyester resin in the methyl ethyl ketone, the said polyester resin comprising the product of reaction of (a) dimethyl terephthalate, (b) ethylene glycol, and (c) glycerine, (2) cooling the solution to below 60° C., (3) heating the cooled mixture of (2) to solvation temperature, (4) cooling the solution to a point where a congealed product is obtained, and (5) dispersing the congealed product in water.

5. The process for making an aqueous suspension of a polyester resin which comprises (1) dissolving the polyester resin in diethyl ketone maintained at a temperature sufficient to effect solution of the polyester resin in the diethyl ketone, the said polyester resin comprising the product of reaction of (a) dimethyl terephthalate, (b) ethylene glycol, and (c) glycerine, (2) cooling the solution to below 60° C., (3) heating the cooled mixture of (2) to solvation temperature, (4) cooling the solution to a point where a congealed product is obtained, and (5) dispersing the congealed product in water.

6. A polyester resin aqueous suspension obtained by (1) dissolving in a heated oxygen-containing solvent selected from the class consisting of acetone, methyl ethyl ketone, tetrahydrofurfuryl alcohol, diethyl ketone, and mixtures of such solvents, a polyester resin comprising the product of reaction of (a) a lower dialkyl ester of a member selected from the class consisting of terephthalic acid, isophthalic acid and mixtures of said members, (b) ethylene glycol, and (c) a saturated aliphatic polyhydric alcohol having at least three hydroxyl groups, (2) cooling the solution thus formed to below 60° C., (3) heating the cooled mixture of (2) to solvation temperature, (4) cooling the solution to a point where a congealed product is obtained, and (5) dispersing the congealed product in water.

7. A polyester resin aqueous suspension obtained in accordance with the process of claim 2.

8. A polyester resin aqueous suspension obtained in accordance with the process of claim 3.

9. A polyester resin aqueous suspension obtained in accordance with the process of claim 4.

10. A polyester resin aqueous suspension obtained in accordance with the process of claim 5.

11. An aqueous suspension of a polyester resin obtained by (1) dissolving a polyester resin in tetrahydrofurfuryl alcohol at a temperature at which the polyester resin is soluble, the said polyester resin comprising the product of reaction of (a) from 25 to 56 equivalent percent dimethyl terephthalate, (b) from 15 to 46 equivalent percent ethylene glycol, and (c) from 13 to 34 equivalent percent glycerine, the sum of said equivalent percents being equal to 100%, (2) cooling the polyester resin solution to below 60° C., (3) heating the cooled mixture of (2) to a temperature sufficient again to dissolve the polyester resin, (4) cooling the latter solution to a point where a congealed product is obtained, (5) adding sufficient water to the congealed material to give a composition in which the polyester resin comprises from 10 to 50 weight percent solids based on the entire weight of the mixture, and (6) mixing the mass to form a homogeneous aqueous suspension.

References Cited in the file of this patent

UNITED STATES PATENTS

| | | |
|---|---|---|
| 2,424,458 | Heijmer | July 22, 1947 |
| 2,936,296 | Precopio et al. | May 10, 1960 |
| 2,975,147 | Abbott et al. | Mar. 14, 1961 |